(12) United States Patent
Bang

(10) Patent No.: US 10,757,571 B2
(45) Date of Patent: Aug. 25, 2020

(54) INTERNET OF THINGS DEVICE

(71) Applicant: UNIONPLACE CO., LTD., Seoul (KR)

(72) Inventor: Seongcheol Bang, Seoul (KR)

(73) Assignee: UNIONPLACE CO., LTD., Seoul (KR)

( * ) Notice: Subject to any disclaimer, the term of this patent is extended or adjusted under 35 U.S.C. 154(b) by 0 days.

(21) Appl. No.: 16/520,136

(22) Filed: Jul. 23, 2019

(65) Prior Publication Data

US 2019/0349762 A1 Nov. 14, 2019

Related U.S. Application Data

(63) Continuation of application No. PCT/KR2017/012656, filed on Nov. 9, 2017.

(30) Foreign Application Priority Data

Feb. 14, 2017 (KR) .......................... 10-2017-0019900

(51) Int. Cl.
*H04L 29/06* (2006.01)
*H04W 12/04* (2009.01)
*H04W 12/00* (2009.01)
*H04W 84/20* (2009.01)

(52) U.S. Cl.
CPC ..... *H04W 12/0401* (2019.01); *H04W 12/001* (2019.01); *H04W 12/0403* (2019.01); *H04W 84/20* (2013.01)

(58) Field of Classification Search
None
See application file for complete search history.

(56) References Cited

U.S. PATENT DOCUMENTS

| | | | |
|---|---|---|---|
| 6,351,536 B1 * | 2/2002 | Sasaki .................... | G06F 21/606 380/255 |
| 2005/0120246 A1 * | 6/2005 | Jang ........................ | H04L 9/083 726/4 |
| 2010/0299519 A1 * | 11/2010 | Xiao ............... | H04W 12/04031 713/155 |
| 2013/0339753 A1 * | 12/2013 | Shibutani ................. | G09C 1/00 713/189 |

(Continued)

FOREIGN PATENT DOCUMENTS

| | | |
|---|---|---|
| EP | 3 021 249 A1 | 5/2016 |
| JP | H 11-220482 A | 8/1999 |
| JP | 2002-111689 A | 4/2002 |

(Continued)

OTHER PUBLICATIONS

Japanese Office Action dated Dec. 22, 2017, issued to Japanese Application No. 2017-230022.

(Continued)

*Primary Examiner* — Maung T Lwin
(74) *Attorney, Agent, or Firm* — Stein IP, LLC

(57) ABSTRACT

Disclosed herein is an Internet of things (IoT) device which is capable of defending against an attack such as hacking while strengthening security of IoT by dynamically determining whether to operate as a master device in an IoT network, and, when the master device is determined, generating, distributing, and managing private keys of other IoT devices in the IoT network.

20 Claims, 11 Drawing Sheets

(56) References Cited

U.S. PATENT DOCUMENTS

2016/0198285 A1* 7/2016 Lin ..................... H04L 67/12
709/209
2017/0134166 A1* 5/2017 Androulaki ........... H04L 9/0891

FOREIGN PATENT DOCUMENTS

| | | |
|---|---|---|
| JP | 2002-232420 A | 8/2002 |
| JP | 2005-210639 A | 8/2005 |
| JP | 2007-258822 A | 10/2007 |
| JP | 2008-104040 A | 5/2008 |
| KR | 10-1999-0053538 A | 7/1999 |
| KR | 10-0559023 B1 | 3/2006 |
| KR | 10-0843813 B1 | 7/2008 |
| KR | 10-44937 B1 | 6/2011 |
| KR | 10-1044937 B1 | 6/2011 |
| KR | 10-1572805 B1 | 12/2015 |
| KR | 10-1701052 B1 | 1/2017 |

OTHER PUBLICATIONS

Japanese Office Action dated May 23, 2018, issued to Japanese Application No. 2017-230022.
Korean Office Action dated Apr. 11, 2017, issued to Korean Application No. 10-2017-0019900.
International Search Report dated Feb. 2, 2018, issued to International Application No. PCT/KR2017/012656.

* cited by examiner

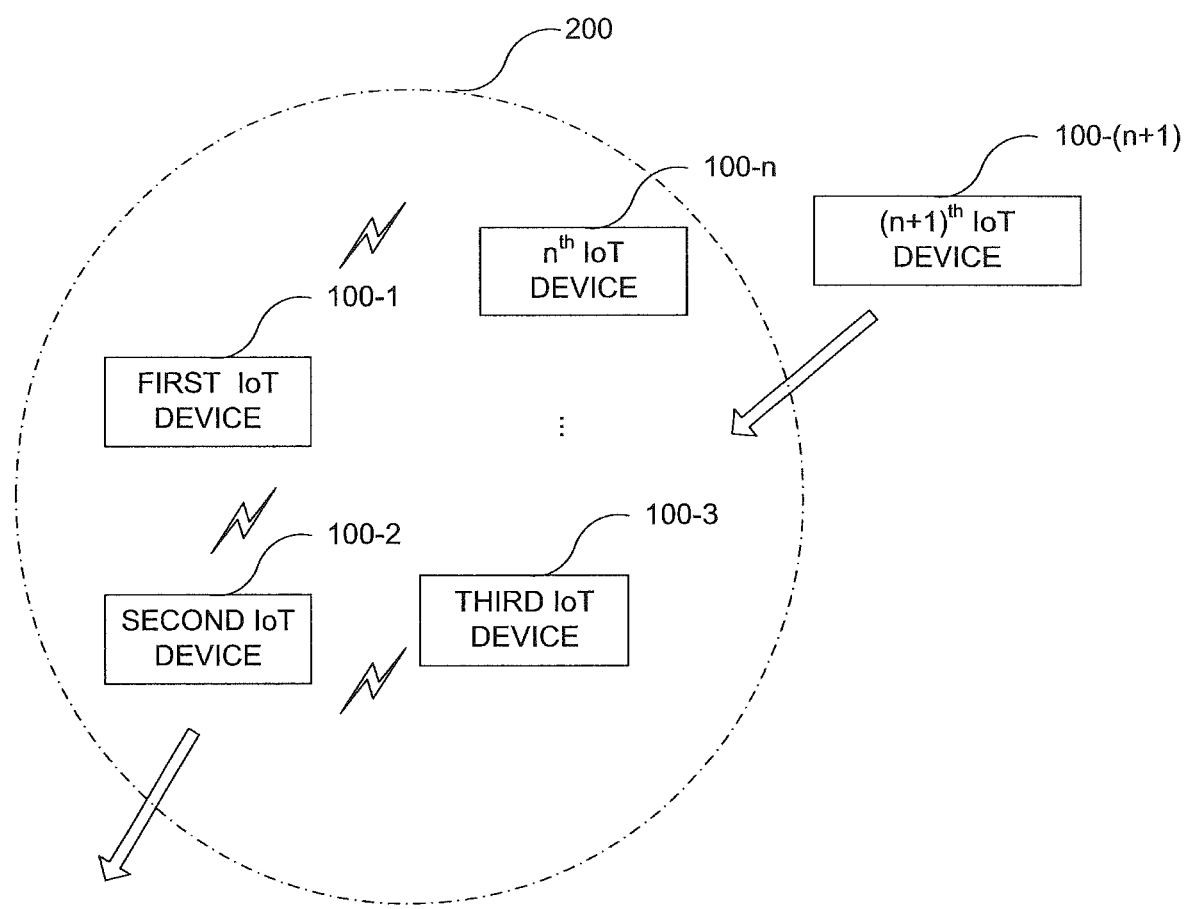

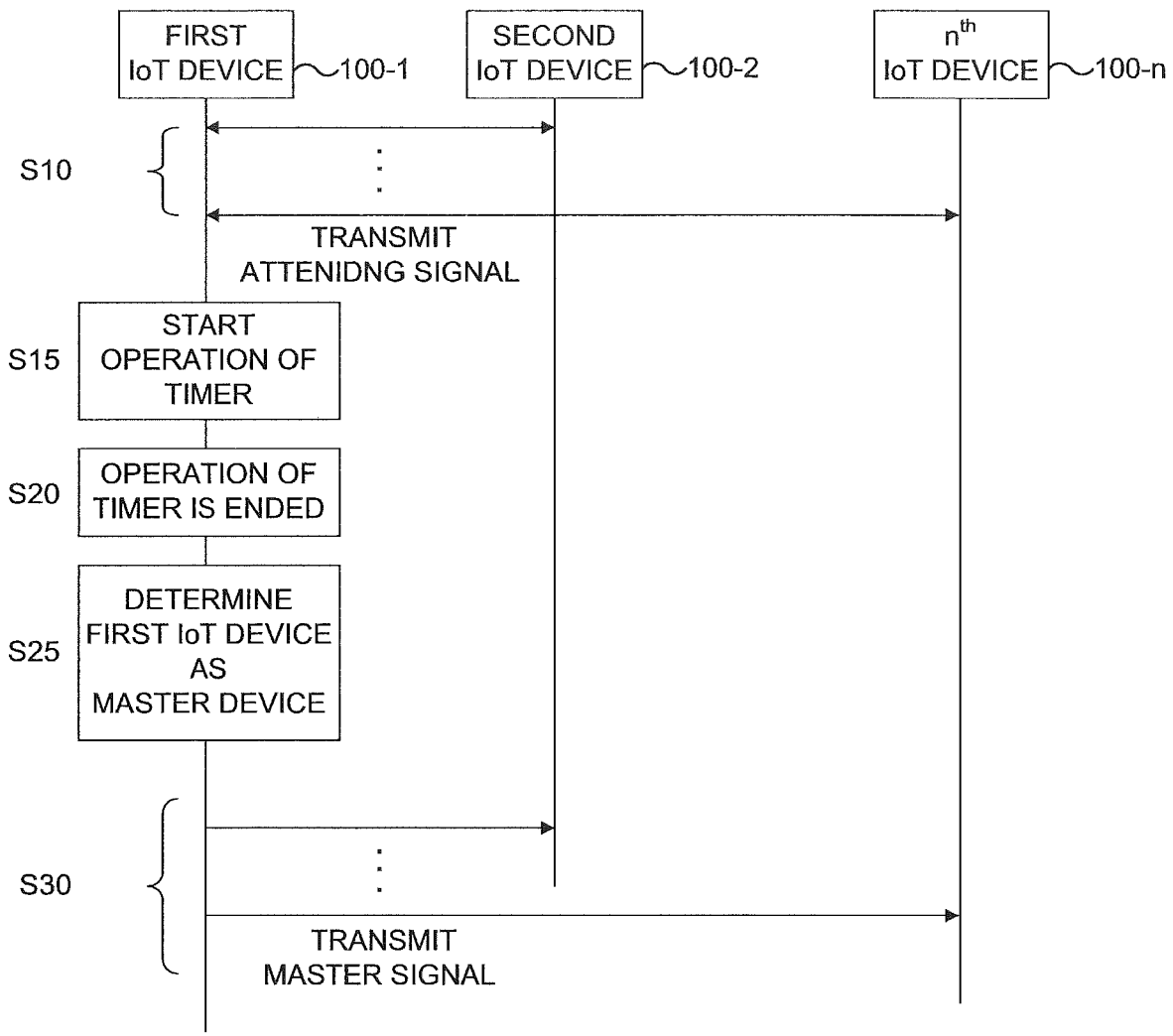

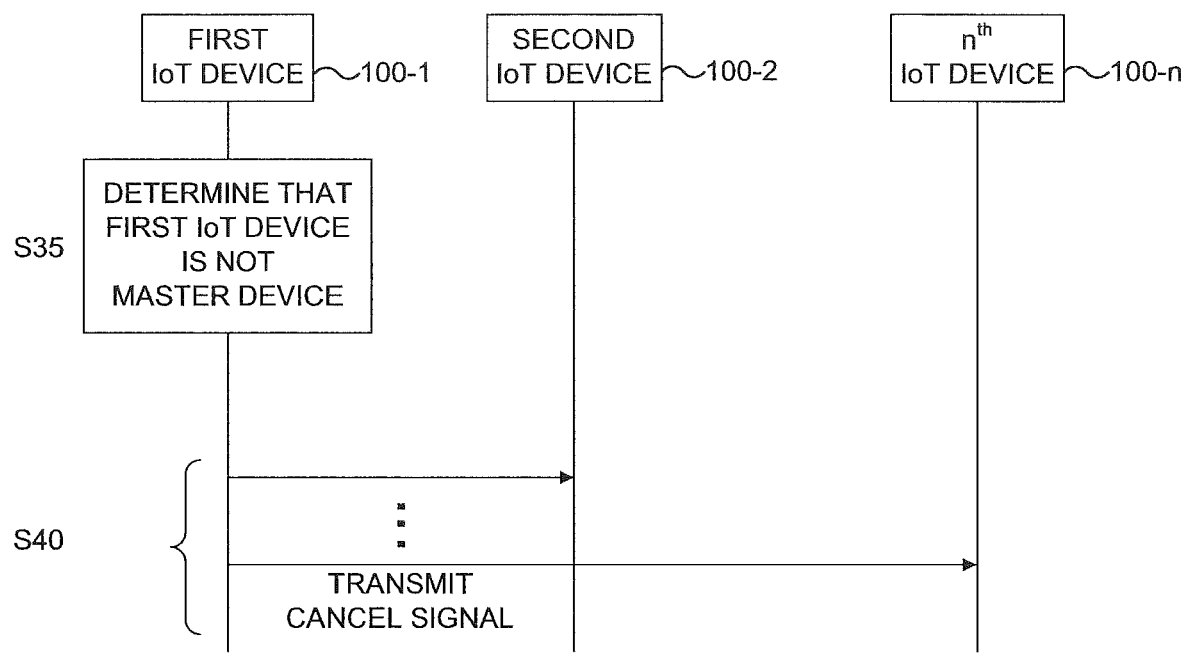

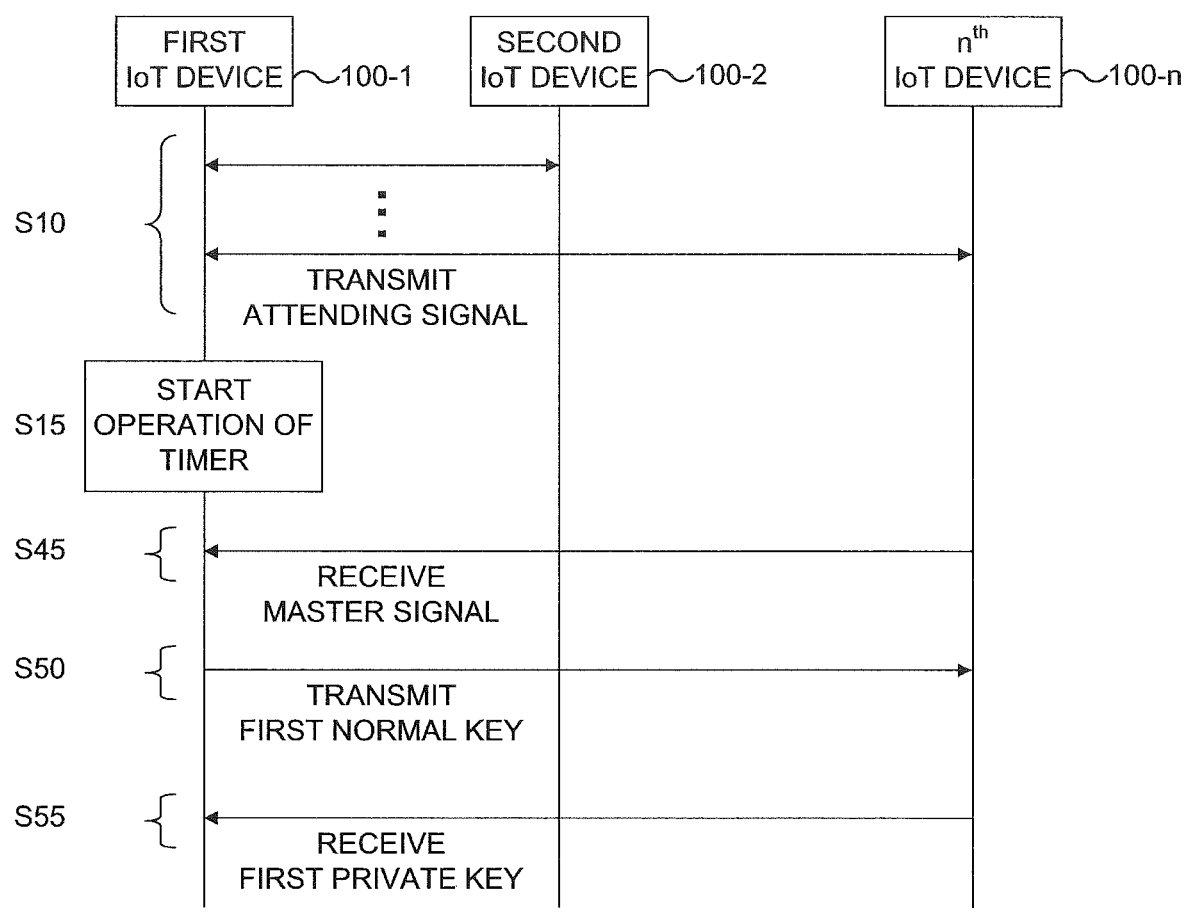

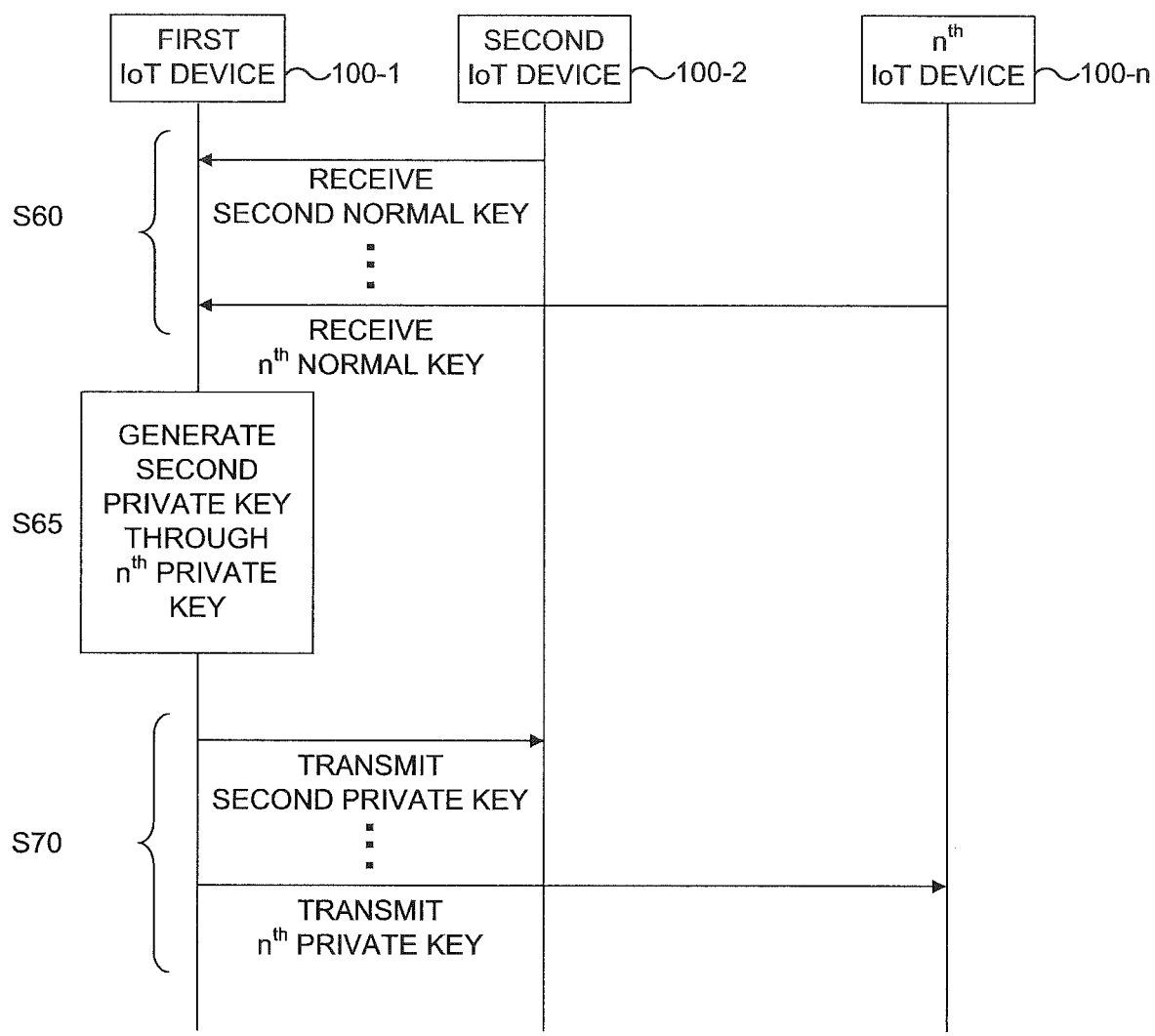

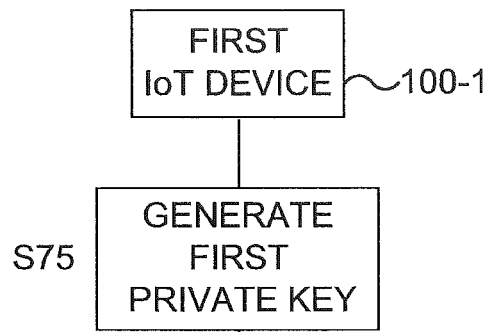
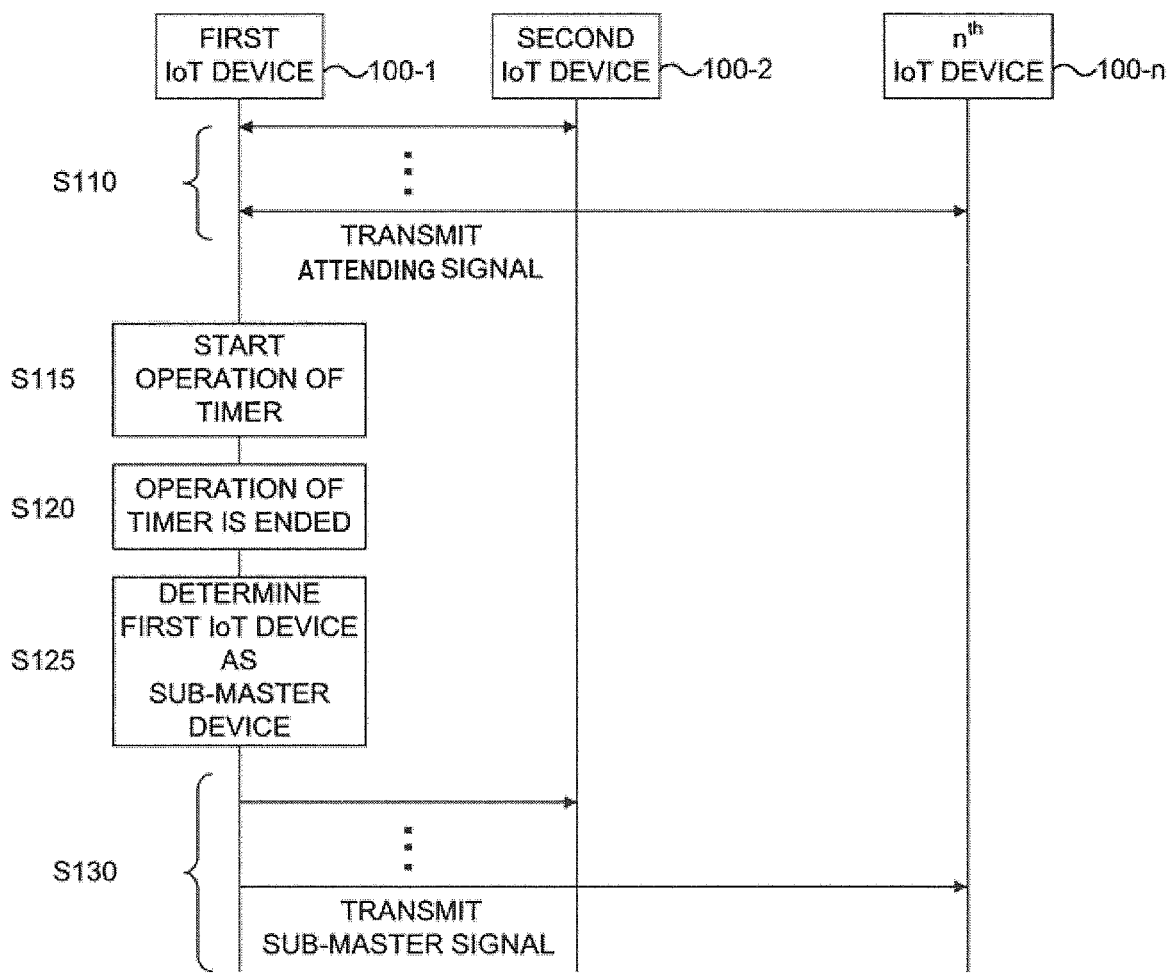

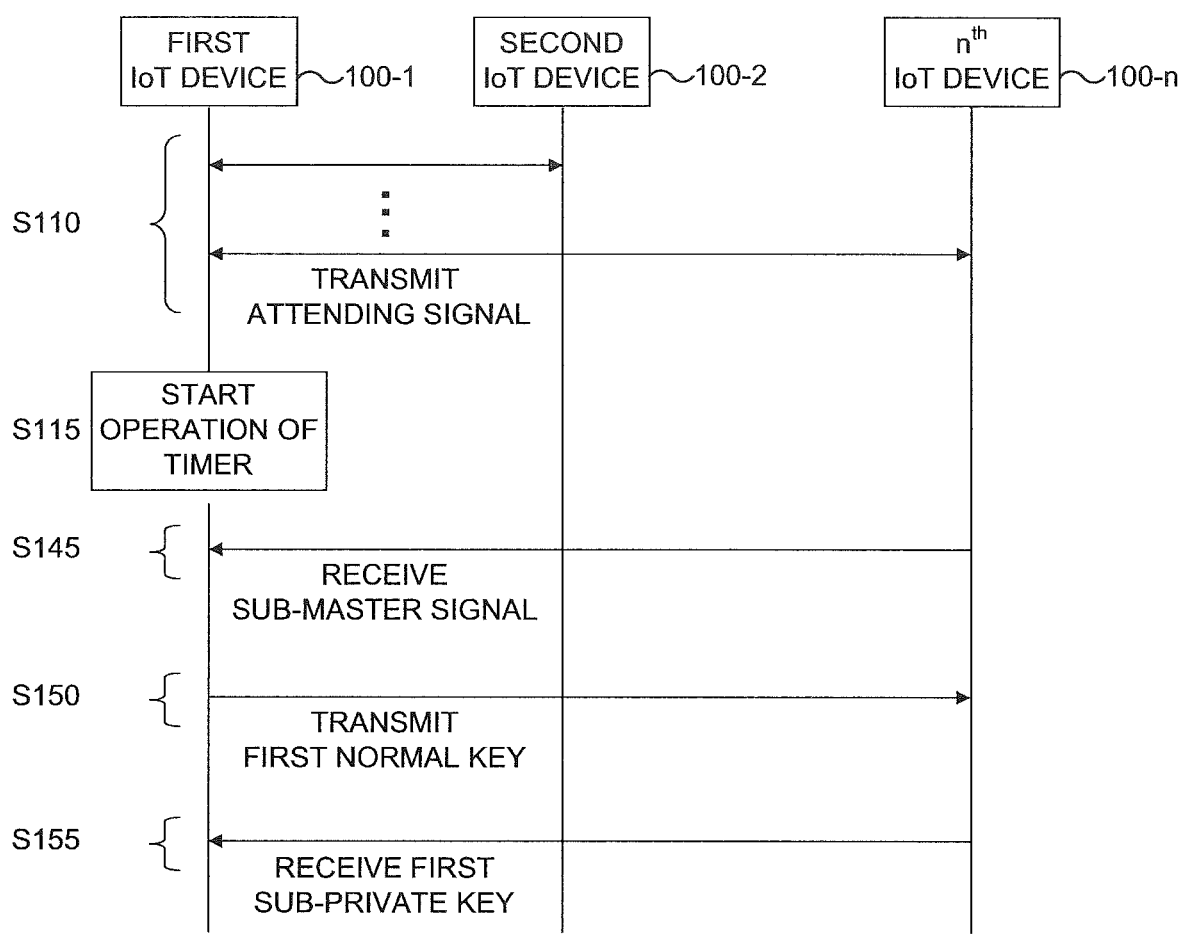

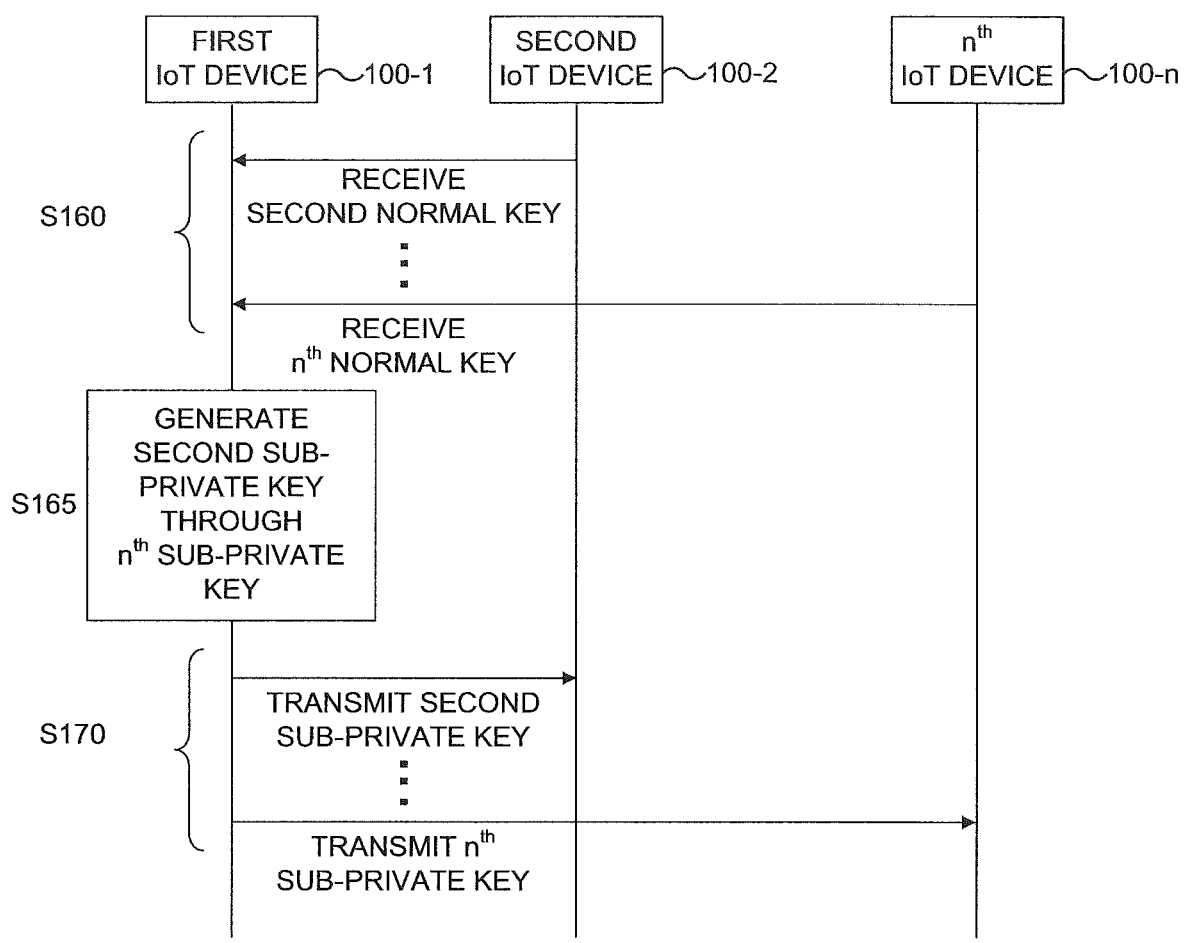

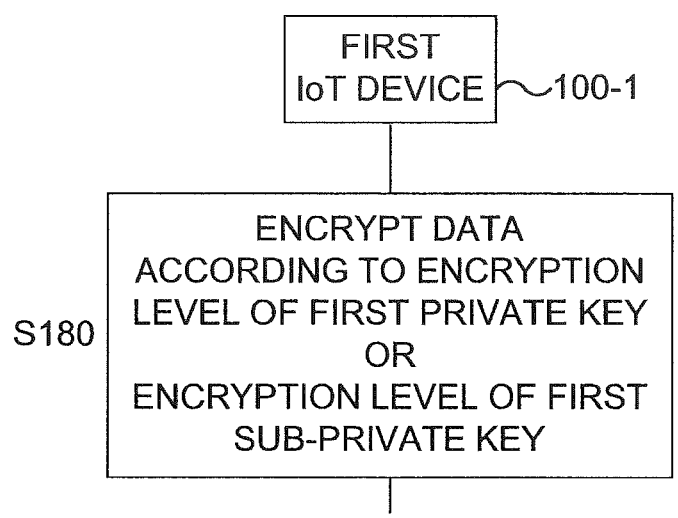

INTERNET OF THINGS DEVICE

CROSS-REFERENCE TO RELATED PATENT APPLICATION

This continuation application claims priority under 35 U.S.C. § 119 of International Application No. PCT/KR2017/012656, filed on Nov. 9, 2017, in the WIPO, and Korean Patent Application No. 10-2017-0019900, filed on Feb. 14, 2017, in the Korean Intellectual Property Office, the entire contents of which are hereby incorporated by reference.

BACKGROUND

1. Field

The present disclosure relates to an Internet of Things (IoT) device which dynamically generates and distributes a private key in an IoT network.

The technique of the present disclosure was developed with the support of the research project of the Ministry of Science and ICT (MSIT), which is managed by the Institute for Information & communications Technology Planning & Evaluation (IITP) (Project Title: "Composite Secure-OS based Open-CPS Next Generation Convergence Security Technology Development for Large-Scale (Five Million) IIoT Security," Project Number: 2019-0-00160).

2. Description of the Related Art

Internet of Things (IoT) technology refers to a technology of embedding sensors and communication functions in various things and connecting the various things to the Internet. According to IoT technology, not only devices such as computers and mobile communication terminals but also various types of devices such as home appliances and wearable devices can be connected to the Internet. In the present specification, a device to which IoT technology is applied is referred to as an "IoT device."

Meanwhile, when IoT devices perform communication with each other, the IoT devices mainly transmit and receive data using wireless communication technology. Thus, a malicious user can illegally collect data or falsify (tamper) data. To prevent such illegal data collection or falsification, it is necessary to strengthen security of IoT.

For example, Korean Patent Registration No. 10-1701052 (Patent Document 1), which is filed on Aug. 26, 2015 by Industry-Academy Cooperation Foundation of Gyeongju Campus of Dongguk University, and issued on Jan. 23, 2017, entitled "Information Security Method in Environment of Internet of Things and Information Security System Using The Method," discloses a method using a certification center which generates a public key (encryption key) and a private key (decryption key) and transmits the public key and the private key to an upload terminal (or a client terminal).

However, according to the method disclosed in Korean Patent Registration No. 10-1701052, an upload terminal receives a public key via a certification center and then only performs a function of transmitting data to a client storage center, and a client terminal receives a decryption key via the certification center and then only performs a function of receiving the data from the client storage center. That is, according to the method disclosed in Korean Patent Registration No. 10-1701052, the certification center is indispensable for encrypting or decrypting data. Therefore, when the certification center receives an attack such as hacking, the upload terminal (or the client terminal) cannot transmit and receive data normally. Further, the method disclosed in Korean Patent Registration No. 10-1701052 can be applied to only a case in which the upload terminal transmits data to the client storage center or the client terminal receives data from the client storage center and cannot be applied to a case in which data is transmitted and received between general IoT devices.

Further, Korean Patent Registration No. 10-1572805 (Patent Document 2), which is filed on Jun. 24, 2014 by Industry-Academy Cooperation Foundation of Kyungpook National University and issued on Nov. 24, 2015, entitled "Method for Providing Security in IoT," discloses a method of using predetermined image information as a security key.

However, the method disclosed in Korean Patent Registration No. 10-1572805 can only be applied to a case in which IoT devices share predetermined image information and cannot be applied to a case in which data is transmitted and received between general IoT devices.

PATENT DOCUMENTS

1. Korean Patent Registration No. 10-1701052
2. Korean Patent Registration No. 10-1572805

SUMMARY

The present disclosure is directed to providing an Internet of things (IoT) device which is capable of defending against an attack such as hacking while strengthening security of IoT by dynamically determining whether a device operates as a master device in an IoT network, and, when the master device is determined, generating, distributing, and managing private keys of other IoT devices in the IoT network.

To solve the above technical problem, according to one aspect of the technique of the present disclosure, there is provided a first IoT (Internet of Things) device in an IoT network of the first IoT device through an $n^{th}$ IoT device (where n is a natural number equal to or greater than 2), the first IoT device including: a key generator configured to store a master key and including a key generation logic for generating a private key based on the master key; a receiver/transmitter configured to communicate with the second IoT device through the $n^{th}$ IoT device in the IoT network; and a processor configured to perform: (a) determining whether the first IoT device is a master device in the IoT network; (b) when the first IoT device is determined to be the master device in the IoT network, generating a second private key through an $n^{th}$ private key respectively corresponding to the second IoT device through the $n^{th}$ IoT device by using the key generator and transmitting the second private key through the $n^{th}$ private key to the second IoT device through the $n^{th}$ IoT device, respectively, via the receiver/transmitter; and (c) when the first IoT device is determined to be not the master device in the IoT network, receiving a first private key corresponding to the first IoT device from one of the second IoT device through the $n^{th}$ IoT device determined as the master device.

According to the technique of the present disclosure, it is possible to provide an Internet of things (IoT) device which is capable of defending against an attack such as hacking while strengthening security of IoT by dynamically determining whether a device operates as a master device in an IoT network, and, when the master device is determined, generating, distributing, and managing private keys of other IoT devices in the IoT network.

BRIEF DESCRIPTION OF THE DRAWINGS

FIG. 2 is a diagram illustrating an exemplary configuration of an IoT network including the IoT device according to the embodiment.

FIGS. 3A to 3C are exemplary diagrams illustrating a process in a processor in the IoT device according to the embodiment.

FIG. 4 is an exemplary diagram illustrating the process in the processor in the IoT device according to the embodiment.

FIG. 5 is an exemplary diagram illustrating the process in the processor in the IoT device according to the embodiment.

FIG. 6 is an exemplary diagram illustrating the process in the processor in the IoT device according to the embodiment.

FIG. 7 is an exemplary diagram illustrating the process in the processor in the IoT device according to the embodiment.

FIG. 8 is an exemplary diagram illustrating the process in the processor in the IoT device according to the embodiment.

FIG. 11 is an exemplary diagram illustrating the process in the processor in the IoT device according to the embodiment.

DETAILED DESCRIPTION

Figure 1:
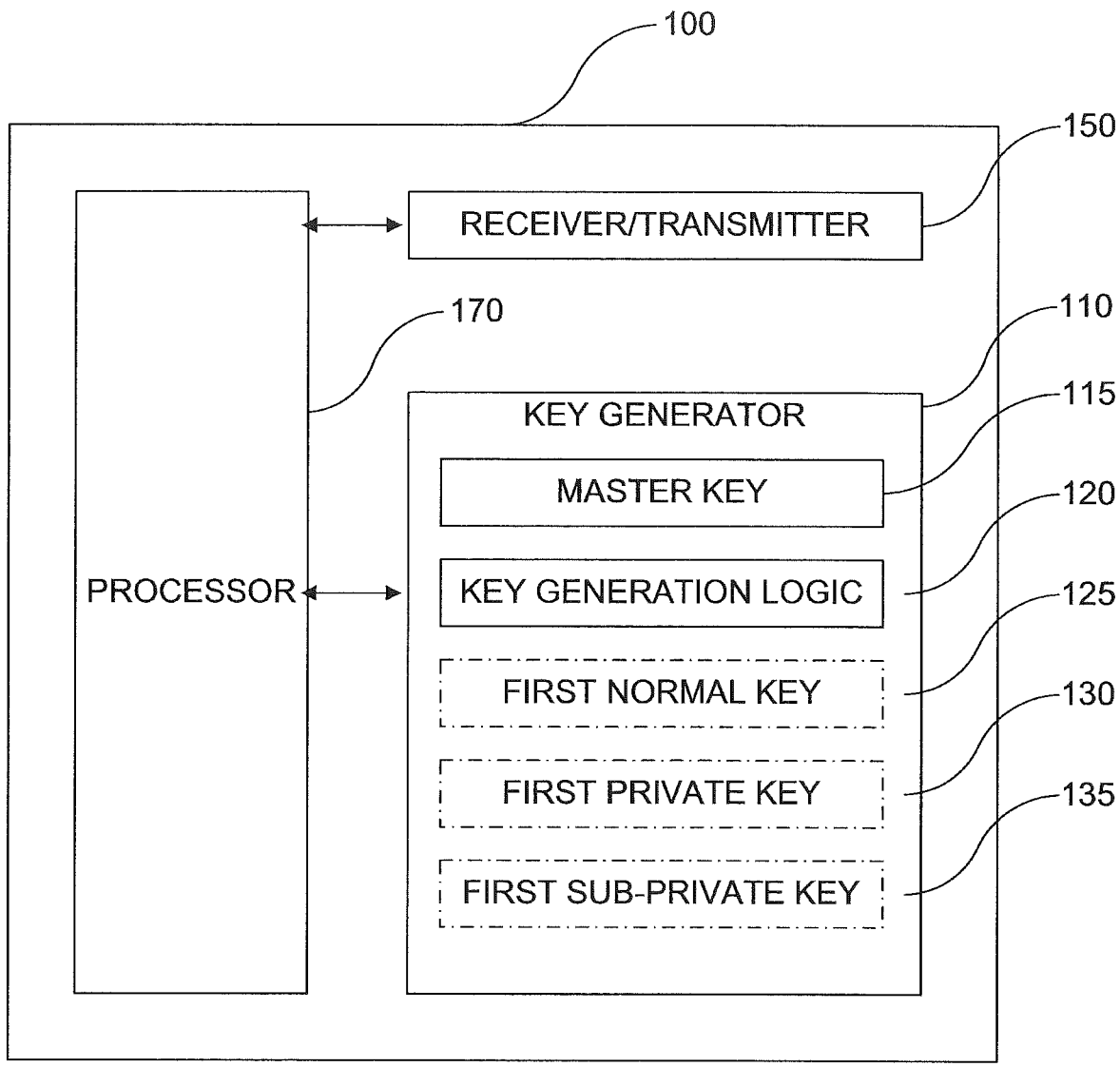
FIG. 1 is a block diagram illustrating an exemplary configuration of an Internet of things (IoT) device according to an embodiment described herein.

Hereinafter, embodiments of an Internet of Things (IoT) device of the present disclosure will be described in more detail with reference to the accompanying drawings. In the drawings for describing the embodiments described herein, for convenience of description, only a part of an actual structure may be shown, a part thereof may be omitted and shown, a part may be modified and shown, or a scale may be shown differently.

FIG. 1 is a block diagram illustrating an exemplary configuration of an Internet of things (IoT) device 100 according to an embodiment described herein. Referring to FIG. 1, the IoT device 100 according to the embodiment includes a key generator 110, a receiver/transmitter 150, and a processor 170.

The key generator 110 stores a master key 115. The key generator 110 may further store a first normal key 125. The key generator 110 may further store at least one among a first private key 130 and a first sub-private key 135. Further, the key generator 110 includes a key generation logic 120 which generates a private key based on the master key 115. The key generation logic 120 has a function of deriving a key using a master key. For example, a derived key is generated by encrypting a master key and derivation data.

This is simply shown as follows.

Derived Key=Encrypt (Master Key, Derivation Data)

Encrypt (A, B) is an encryption function using A and B.

The key generation logic 120 generates a private key based on the master key 115. That is, the private key may be derived using the master key 115 and derivation data which are pre-stored. The derivation data, which will be described below, may be at least one among a first normal key 125 to an $n^{th}$ normal key corresponding to a first IoT device 100-1 to an $n^{th}$ IoT device 100-$n$, respectively. That is, the first normal key 125 to the $n^{th}$ normal key, which will be described below, are pieces of data which are formed to generate the private key by being used in the key generation logic 120 together with the master key 115. The first normal key 125 to the $n^{th}$ normal key may be used as public keys. For example, the first normal key 125 may be used as a public key of the first IoT device 100-1, and the $n^{th}$ normal key may be used as a public key of the $n^{th}$ IoT device 100-$n$. However, the first normal key 125 may not be the public key of the first IoT device 100-1, and the first IoT device 100-1 may use another public key instead of the first normal key 125. Similarly, the $n^{th}$ normal key may not be the public key of the $n^{th}$ IoT device 100-$n$, and the $n^{th}$ IoT device 100-$n$ may use another public key instead of the $n^{th}$ normal key.

The key generation logic 120 may derive a private key from either a first encryption level or a second encryption level. For example, the first encryption level may be a level for generating a 128-bit key, and the second encryption level may be a level for generating an 8-bit key.

Preferably, the key generator 110 is formed to not be replicated physically. The key generator 110 may be formed independently from the receiver/transmitter 150 and the processor 170. For example, the key generator 110 may be implemented using an Europay MasterCard Visa (EMV) chip manufactured according to an EMV standard in which external illegal access is impossible, or a trusted execution environment (TEE) chip manufactured according to a TEE standard including trust elements in which external illegal access is impossible. Thus, the master key 115 and the key generation logic 120 are maintained in the key generator 110 according to a very high security level. Similarly, the first normal key 125, the first private key 130, and the first sub-private key 135, which will be described below, may also be maintained in the key generator 110 according to a very high security level.

The receiver/transmitter 150 performs communication with other IoT devices of an IoT network including the IoT device 100 according to the embodiment.

FIG. 2 is a diagram illustrating an exemplary configuration of an IoT network including the IoT device according to the embodiment. Referring to FIG. 2, an IoT network 200 includes a first IoT device 100-1 and a second IoT device 100-2 to an $n^{th}$ IoT device 100-$n$ (n is a natural number equal to or greater than two). The number of IoT devices included in the IoT network 200 may be changed. For example, an $(n+1)^{th}$ IoT device 100-$(n+1)$ may be added to the IoT network 200 shown in FIG. 2, or at least one among the second IoT device 100-2 to the $n^{th}$ IoT device 100-$n$ may be excluded from the IoT network 200. For example, when the second IoT device 100-2 malfunctions, the second IoT device 100-2 may be excluded from the IoT network 200.

The IoT device 100 according to the embodiment may be at least one among the first IoT device 100-1 to the $n^{th}$ IoT device 100-$n$. For example, the IoT device 100 according to the embodiment may be the first IoT device 100-1. Alternatively, all of the first IoT device 100-1 and the second IoT device 100-2 to the $n^{th}$ IoT device 100-$n$, which are included in the IoT network 200, may operate as the IoT device 100 according to the embodiment. That is, the second IoT device 100-2 includes a key generator (not shown), a receiver/transmitter (not shown), and a processor (not shown), and similarly, the n$^{th}$ IoT device 100-n includes a key generator (not shown), a receiver/transmitter (not shown), and a processor (not shown).

The key generator of the second IoT device 100-2 stores a master key identical to or different from a master key of the first IoT device 100-1 and has a key generation logic (not shown). Further, the key generator of the second IoT device 100-2 may store a second normal key in advance and may further store a second private key and a second sub-private key. Similarly, the key generator of the n$^{th}$ IoT device 100-n stores a master key identical to or different from the master key of the first IoT device 100-1 and has a key generation logic (not shown). Further, the key generator of the n$^{th}$ IoT device 100-n may store an n$^{th}$ normal key in advance and may further store an n$^{th}$ private key and an n$^{th}$ sub-private key.

The normal keys, i.e., the first normal key to the n$^{th}$ normal key, may be stored in advance in corresponding ones among the first IoT device 100-1 to the n$^{th}$ IoT device 100-n. For example, the normal keys are determined according to a policy of a manufacturer or user of the first IoT device 100-1 to the n$^{th}$ IoT device 100-n. For example, the normal keys may also be used as values which are capable of determining whether the first IoT device 100-1 to the n$^{th}$ IoT device 100-n may be included in the IoT network 200. That is, only an IoT device which includes a normal key determined according to a specific policy may be added to the IoT network 200. For example, only an IoT device which includes a normal key determined according to a policy of a specific automaker may be added to an IoT network in a specific vehicle. As described above, the normal key may be used as a public key but also may not be used as the public key.

Hereinafter, the IoT device 100 according to the embodiment will be described by assuming that the IoT device 100 according to the embodiment is the first IoT device 100-1 shown in FIG. 2. Detailed configurations of the second IoT device 100-2 to the n$^{th}$ IoT device 100-n may be different from the configuration of the first IoT device 100-1. However, each of the second IoT device 100-2 to the n$^{th}$ IoT device 100-n includes the key generator 110, the receiver/transmitter 150, and the processor 170. Therefore, since an operation of generating and managing a private key in each of the second IoT device 100-2 to the n$^{th}$ IoT device 100-n are substantially the same as an operation in the first IoT device 100-1, detailed descriptions of the second IoT device 100-2 to the n$^{th}$ IoT device 100-n will be omitted.

As described above, the receiver/transmitter 150 performs communication with other IoT devices of the IoT network 200 including the IoT device 100 according to the embodiment. For example, since the IoT device 100 according to the embodiment is the first IoT device 100-1, the receiver/transmitter 150 performs communication with the second IoT device 100-2 to the n$^{th}$ IoT device 100-n which are included in the IoT network 200.

The processor 170 performs the following process.

1) Process of Determining Whether the First IoT Device 100-1 is a Master Device in the IoT Network 200

A master device is any one among the first IoT device 100-1 to the n$^{th}$ IoT device 100-n which are included in the IoT network 200. The master device is a device which generates private keys of the first IoT device 100-1 to the n$^{th}$ IoT device 100-n, i.e., first to n$^{th}$ private keys, and transmits the generated first to n$^{th}$ private keys to other devices which are not the master device among the first IoT device 100-1 to the n$^{th}$ IoT device 100-n. For example, when the first IoT device 100-1 is a master device, the second IoT device 100-2 to the n$^{th}$ IoT device 100-n may also be referred to as slave devices.

FIGS. 3A to 3C are exemplary diagrams illustrating a process in the processor 170 in the IoT device according to the embodiment. FIG. 3A illustrates a process in which the processor 170 determines whether the first IoT device 100-1 is a master device in the IoT network 200.

As described above, since the IoT device 100 according to the embodiment is the first IoT device 100-1, the processor 170 performs a process of determining whether the first IoT device 100-1 is the master device in the IoT network 200.

Referring to FIG. 3A, the processor 170 transmits a network participation signal (an "attending signal" of FIG. 3A) to each of the second IoT device 100-2 to the n$^{th}$ IoT device 100-n via the receiver/transmitter 150 (S10).

Preferably, after the processor 170 transmits the network participation signal to each of the second IoT device 100-2 to the n$^{th}$ IoT device 100-n, the processor 170 may receive a response signal (not shown) with respect to the network participation signal (the "attending signal" of FIG. 3A) from each of the second IoT device 100-2 to the n$^{th}$ IoT device 100-n via the receiver/transmitter 150. The response signal has a format similar to that of the network participation signal.

Next, the processor 170 operates a timer (not shown) based on unique identification information of the first IoT device 100-1 or an arbitrarily determined value (S15). The timer is one of functions embedded in the processor 170. The unique identification information of the first IoT device 100-1 is identification information which does not overlap identification information of the second IoT device 100-2 to the n$^{th}$ IoT device 100-n. Preferably, the unique identification information is formed to correspond to only the first IoT device 100-1. For example, the unique identification information of the first IoT device 100-1 may be a unique value determined based on a radioactive isotope of a semiconductor corresponding to the first IoT device 100-1.

Until the operation of the timer is terminated (S20), when a signal indicating that one among the second IoT device 100-2 to the n$^{th}$ IoT device 100-n has been determined as a master device is not received from any one among the second IoT device 100-2 to the n$^{th}$ IoT device 100-n, the processor 170 determines the first IoT device 100-1 as a master device (S25).

After the first IoT device 100-1 is determined as the master device, the processor 170 may transmit a signal indicating that the first IoT device 100-1 has been determined as the master device (a "master signal" of FIG. 3A) to each of the second IoT device 100-2 to the n$^{th}$ IoT device 100-n (S30). That is, the processor 170 may notify the second IoT device 100-2 to the n$^{th}$ IoT device 100-n which are included in the IoT network 200 that the first IoT device 100-1 is determined as the master device.

Meanwhile, even after the first IoT device 100-1 is determined as the master device, the processor 170 may determine that the first IoT device 100-1 is not the master device.

FIG. 3B illustrates a process of determining, after the processor 170 determines the first IoT device 100-1 as the master device in the IoT network 200, the first IoT device 100-1 as not being the master device again.

Referring to FIG. 3B, after the processor 170 determines the first IoT device 100-1 as the master device in operation S25, when a predetermined condition is satisfied, the processor 170 determines that the first IoT device 100-1 is not the master device (S35).

The predetermined condition is as follows.

First, the predetermined condition corresponds to a case in which at least one IoT device is added to the IoT network 200. That is, in the IoT network 200 shown in FIG. 2, the predetermined condition corresponds to a case in which an (n+1)th IoT device 100-(n+1) is added.

Next, in the IoT network 200, the predetermined condition corresponds to a case in which at least one IoT device is excluded. That is, in the IoT network 200 shown in FIG. 2, the predetermined condition corresponds to a case in which any one among the second IoT device 100-2 to the $n^{th}$ IoT device 100-$n$ is excluded. For example, when the second IoT device 100-2 malfunctions or the second IoT device 100-2 fails and thus an operation thereof is no longer possible, the second IoT device 100-2 is excluded from the IoT network 200.

As described above, when the number of IoT devices included in the IoT network 200 is changed, the first IoT device 100-1 may directly operate as a master device. For example, when the second IoT device 100-2 is excluded from the IoT network 200, the first IoT device 100-1 may directly operate as the master device. Further, even when the $(n+1)^{th}$ IoT device 100-(n+1) is added, the first IoT device 100-1 may directly operate as the master device. When the $(n+1)^{th}$ IoT device 100-1(n+1) is added, the $(n+1)^{th}$ IoT device 100-(n+1) transmits an $(n+1)^{th}$ normal key to the first IoT device 100-1. The processor 170 generates an $(n+1)^{th}$ private key using the master key 115 and the $(n+1)^{th}$ normal key by using the key generation logic 120 and transmits the $(n+1)^{th}$ private key to the $(n+1)^{th}$ IoT device 100-(n+1) using the receiver/transmitter 150.

However, when the number of IoT devices included in the IoT network 200 is changed, a new master device may be determined again. That is, the above-described process of determining a master device may be performed by including the newly added IoT device. For example, the processor 170 may determine the first IoT device 100-1 as the master device again through operations S10 to S30 shown in FIG. 3A. Alternatively, with reference to a description, which will be made below, relating to FIG. 3C, the processor 170 may determine that the first IoT device 100-1 is not the master device.

Meanwhile, the processor 170 may directly determine that the first IoT device 100-1 is not the master device without performing operations S10 to S30 shown in FIG. 3A. That is, when the first IoT device 100-1 is determined as the master device and then it is determined that the first IoT device 100-1 is not the master device, the processor 170 may automatically determine that the first IoT device 100-1 is not the master device without transmitting the network participation signal (the "attending signal" of FIG. 3A).

Next, in the IoT network 200, the predetermined condition corresponds to a case in which the first IoT device 100-1 receives an external attack such as hacking. When the first IoT device 100-1 receives an attack such as hacking and continues to operate as the master device, a security problem may occur. Accordingly, the processor 170 determines that the first IoT device 100-1 is not the master device (S35). Even in this case, the processor 170 may directly determine that the first IoT device 100-1 is not the master device without performing operations S10 to S30 shown in FIG. 3A. That is, when the first IoT device 100-1 receives an attack such as hacking, the processor 170 may automatically determine that the first IoT device 100-1 is not the master device without transmitting the network participation signal (the "attending signal" of FIG. 3A).

After the processor 170 performs operation S35 and determines that the first IoT device 100-1 is not the master device through operation S35, the processor 170 may transmit a signal indicating that the first IoT device 100-1 is not the master device (a "cancel signal" of FIG. 3B) to each of the second IoT device 100-2 to the $n^{th}$ IoT device 100-$n$ (S40) via the receiver/transmitter 150.

FIG. 3C illustrates a process in which the processor 170 determines that the first IoT device 100-1 is not the master device in the IoT network 200 and then the processor 170 receives a first private key from a master device.

Referring to FIG. 3C, the processor 170 operates the timer in operation S15, and then, before the operation of the timer is terminated, the processor 170 receives a signal indicating that any one among the second IoT device 100-2 to the $n^{th}$ IoT device 100-$n$ has been determined as the master device (a "master signal" of FIG. 3C) from one among the second IoT device 100-2 to the $n^{th}$ IoT device 100-$n$ via the receiver/transmitter 150 (S45).

When the processor 170 receives the signal indicating that any one among the second IoT device 100-2 to the $n^{th}$ IoT device 100-$n$ has been determined as the master device (the "master signal" of FIG. 3C) in operation S45, the processor 170 determines that the first IoT device 100-1 is not the master device.

Operations S50 and S55 of FIG. 3C will be described below.

2) Process of Generating and Transmitting Private Keys

When the first IoT device 100-1 is the master device, the processor 170 performs the following process. That is, in the description which is made with reference to FIG. 3A, when the processor 170 determines the first IoT device 100-1 as the master device, the processor 170 performs the following process.

FIG. 4 illustrates a process in which the processor 170 generates and transmits private keys of the second IoT device 100-2 to the $n^{th}$ IoT device 100-$n$, i.e., second to $n^{th}$ private keys in the IoT network 200.

Referring to FIG. 4, the processor 170 receives normal keys of the second IoT device 100-2 to the $n^{th}$ IoT device 100-$n$, i.e., a second normal key to an $n^{th}$ normal key, via the receiver/transmitter 150 (S60).

Next, the processor 170 generates private keys corresponding to the second IoT device 100-2 to the $n^{th}$ IoT device 100-$n$, i.e., the second private key to the $n^{th}$ private key by using the key generator 110 (S65). For example, the processor 170 generates the second private key to the $n^{th}$ private key by inputting the second normal key to the $n^{th}$ normal key into the above-described key generation logic 120 (S65).

The key generation logic 120 may generate the second private key to the $n^{th}$ private key using the above-described "Encrypt" function. For example, the second private key is generated using Encrypt (master key, second normal key), and the $n^{th}$ private key is generated using Encrypt (master key, $n^{th}$ normal key).

Next, the processor 170 transmits the second private key to the $n^{th}$ private key, which are generated in operation S65, to the second IoT device 100-2 to the $n^{th}$ IoT device 100-$n$ (S70). For example, the processor 170 transmits the second private key to the second IoT device 100-2 via the receiver/transmitter 150. Similarly, the processor 170 transmits the $n^{th}$ private key to the $n^{th}$ IoT device 100-$n$ via the receiver/transmitter 150.

Meanwhile, even when the processor 170 determines the first IoT device 100-1 as the master device, the processor

170 may generate the private key of the first IoT device 100-1, i.e., the first private key.

FIG. 5 illustrates a process in which the processor 170 generates the private key of the first IoT device 100-1, i.e., the first private key.

The key generator 110 may further store a normal key of the first IoT device 100-1, i.e., the first normal key 125 of FIG. 1. The processor 170 may generate the first private key 130 of FIG. 1 using the master key 115 of FIG. 1 and the first normal key 125 of FIG. 1 by using the key generator 110 (S75).

Similar to the above description, specifically, the first private key 130 of FIG. 1 may be generated using Encrypt (master key, first normal key).

Meanwhile, the key generator 110 may further store the first private key 130 of FIG. 1 generated in operation S75.

3) Process of Receiving First Private Key

When the first IoT device 100-1 is not the master device, the processor 170 performs the following process.

Referring again to FIG. 3C, when the signal indicating that any one among the second IoT device 100-2 to the $n^{th}$ IoT device 100-n has been determined as the master device (the "master signal" of FIG. 3C) in operation S45, the processor 170 transmits the first normal key 125 of FIG. 1 to the master device which is one among the second IoT device 100-2 to the $n^{th}$ IoT device 100-n via the receiver/transmitter 150 (S50).

Next, the processor 170 receives a first private key from the master device (S55).

Preferably, the key generator 110 may further store the first private key 130 of FIG. 1.

Through the above-described process, the first private key 130 of FIG. 1, which will be used when the first IoT device 100-1 performs encrypted communication, is obtained from the master device.

Meanwhile, the processor 170 may further perform the following process.

4) Process of Determining Whether the First IoT Device 100-1 is a Sub-Master Device in the IoT Network 200

FIG. 6 illustrates a process in which the processor 170 determines whether the first IoT device 100-1 is a sub-master device in the IoT network 200. The sub-master device is any one among the first IoT device 100-1 to the $n^{th}$ IoT device 100-n. Devices which are not the sub-master device among the first IoT device 100-1 to the $n^{th}$ IoT device 100-n may also be referred to as sub-slave devices.

Referring to FIG. 6, the processor 170 transmits a network participation signal (an "attending signal" of FIG. 6) to each of the second IoT device 100-2 to the $n^{th}$ IoT device 100-n via the receiver/transmitter 150 (S110). Operation S110 of FIG. 6 is similar to operation S10 of FIG. 3A, but there is a difference that the network participation signal (the "attending signal" of FIG. 6) is transmitted in operation S110 of FIG. 6 so as to determine a sub-master device, whereas the network participation signal (the "attending signal" of FIG. 3A) is transmitted in operation S10 of FIG. 3A so as to determine a master device.

Next, the processor 170 operates the timer (S115). Until the operation of the timer is terminated (S120), when a signal, which indicates that one among the second IoT device 100-2 to the $n^{th}$ IoT device 100-n has been determined as a master device, is not received from any one among the second IoT device 100-2 to the $n^{th}$ IoT device 100-n, the processor 170 determines the first IoT device 100-1 as a sub-master device (S125).

After the first IoT device 100-1 is determined as the sub-master device, the processor 170 may transmit a signal indicating that the first IoT device 100-1 has been determined as the sub-master device (a "sub-master signal" of FIG. 6) to each of the second IoT device 100-2 to the $n^{th}$ IoT device 100-n (S130).

Except that operations S110 to S130 of FIG. 6 are performed so as to determine the sub-master device whereas operations S10 to S30 of FIG. 3A are performed so as to determine the master device, operations S110 to S130 of FIG. 6 are substantially identical to operations S10 to S30 of FIG. 3A, and thus detailed descriptions thereof will be omitted.

FIG. 7 illustrates a process in which the processor 170 determines the first IoT device 100-1 as not being the sub-master device in the IoT network 200 and then the processor 170 receives a first sub-private key from a master device.

Referring to FIG. 7, the processor 170 operates the timer in operation S115, and then, before the operation of the timer is terminated, the processor 170 receives a signal indicating that any one among the second IoT device 100-2 to the $n^{th}$ IoT device 100-n has been determined as the sub-master device (a "sub-master signal" of FIG. 7) from one among the second IoT device 100-2 to the $n^{th}$ IoT device 100-n via the receiver/transmitter 150 (S145).

When the processor 170 receives the signal indicating that any one among the second IoT device 100-2 to the $n^{th}$ IoT device 100-n has been determined as the sub-master device (the "sub-master signal" of FIG. 7) in operation S145, the processor 170 determines the first IoT device 100-1 as not being the sub-master device.

Operations S150 and S155 of FIG. 7 will be described below.

5) Process of Receiving the First Sub-Private Key

When the first IoT device 100-1 is not the sub-master device, the processor 170 performs the following process.

Referring to FIG. 7 again, when the signal indicating that any one among the second IoT device 100-2 to the $n^{th}$ IoT device 100-n has been determined as the sub-master device (the "sub-master signal" of FIG. 7) in operation S145, the processor 170 transmits the first normal key 125 of FIG. 1 to the sub-master device, i.e., one among the second IoT device 100-2 to the $n^{th}$ IoT device 100-n, which has been determined as the sub-master device, via the receiver/transmitter 150 (S150).

Next, the processor 170 receives the first sub-private key 135 of FIG. 1 from the sub-master device (S155). Preferably, the key generator 110 may further store the first sub-private key 135 of FIG. 1.

Through the above-described process, the first sub-private key 135 of FIG. 1, which will be used when the first IoT device 100-1 performs encrypted communication, is obtained from the sub-master device.

6) Process of Generating and Transmitting Sub-Private Keys

When the first IoT device 100-1 is the sub-master device, the processor 170 performs the following process. That is, in the description which is made with reference to FIG. 6, when the processor 170 determines the first IoT device 100-1 as the sub-master device, the processor 170 performs the following process.

FIG. 8 illustrates a process in which the processor 170 generates and transmits sub-private keys of the second IoT device 100-2 to the $n^{th}$ IoT device 100-n, i.e., second to $n^{th}$ sub-private keys in the IoT network 200.

Referring to FIG. 8, the processor 170 receives normal keys of the second IoT device 100-2 to the $n^{th}$ IoT device 100-*n*, i.e., the second normal key to the $n^{th}$ normal key, via the receiver/transmitter 150 (S160).

Next, the processor 170 generates sub-private keys corresponding to the second IoT device 100-2 to the $n^{th}$ IoT device 100-*n*, i.e., the second sub-private key to the $n^{th}$ sub-private key, by using the key generator 110 (S165). For example, the processor 170 generates the second sub-private key to the $n^{th}$ sub-private key by inputting the second normal key to the $n^{th}$ normal key into the above-described key generation logic 120 (S165).

The key generation logic 120 may generate the second sub-private key to the $n^{th}$ sub-private key using the above-described "Encrypt" function. For example, the second sub-private key is generated using Encrypt (master key, second normal key), and the $n^{th}$ sub-private key is generated using Encrypt (master key, $n^{th}$ normal key).

As described above, the key generation logic 120 may derive the private key from either a first encryption level or a second encryption level. For example, the first encryption level may be a level for generating a 128-bit key, and the second encryption level may be a level for generating an 8-bit key For example, the private key may be used when the first IoT device 100-1 to the $n^{th}$ IoT device 100-*n* transmit and receive security-sensitive data, and the sub-private key may be used when the first IoT device 100-1 to the $n^{th}$ IoT device 100-*n* transmit and receive less security-sensitive data.

For example, since data including a health check or a log transfer is less sensitive to security, the data may be transmitted and received using the sub-private key between the first IoT device 100-1 to the $n^{th}$ IoT device 100-*n*.

Meanwhile, since data including detection data or a control signal is security-sensitive data, the data be transmitted and received using the private key between the first IoT device 100-1 to the $n^{th}$ IoT device 100-*n*.

Next, the processor 170 transmits the second sub-private key to the $n^{th}$ sub-private key, which are generated in operation S165, to the second IoT device 100-2 to the $n^{th}$ IoT device 100-*n* (S170). For example, the processor 170 transmits the second sub-private key to the second IoT device 100-2 via the receiver/transmitter 150. Similarly, the processor 170 transmits the $n^{th}$ sub-private key to the $n^{th}$ IoT device 100-*n* via the receiver/transmitter 150.

Meanwhile, even when the processor 170 determines the first IoT device 100-1 as the sub-master device, the processor 170 may generate the sub-private key of the first IoT device 100-1, i.e., the first sub-private key.

Figure 9:
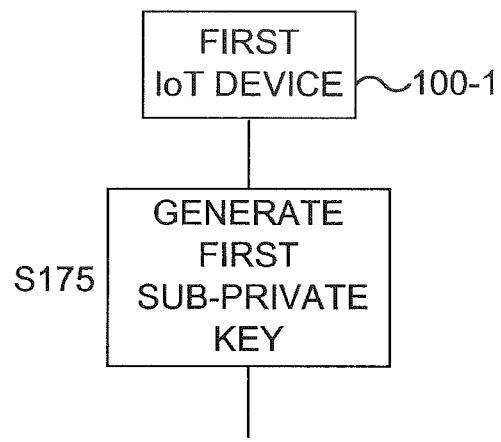
FIG. 9 is an exemplary diagram illustrating the process in the processor in the IoT device according to the embodiment.

FIG. 9 illustrates a process in which the processor 170 generates the sub-private key of the first IoT device 100-1, i.e., the first sub-private key.

The key generator 110 may further store a normal key of the first IoT device 100-1, i.e., the first normal key 125 of FIG. 1.

The processor 170 may generate the first sub-private key using the master key 115 of FIG. 1 and the first normal key 125 of FIG. 1 by using the key generator 110 (S175).

Similar to the above description, specifically, the first sub-private key may be generated using Encrypt (master key, first normal key).

As described above, the key generation logic 120 may generate the private key at a first encryption level and a sub-private key at a second encryption level. That is, it is preferable that the first private key 130 of FIG. 1 and the first sub-private key 135 of FIG. 1 have different encryption levels.

Preferably, the key generator 110 may further store the first sub-private key 135 of FIG. 1.

7) Process of Encrypting Data According to the Encryption Level of the First Private Key The processor 170 may further perform a process of encrypting data according to the encryption level of the first private key 130 of FIG. 1 of the first IoT device 100-1.

Figure 10:
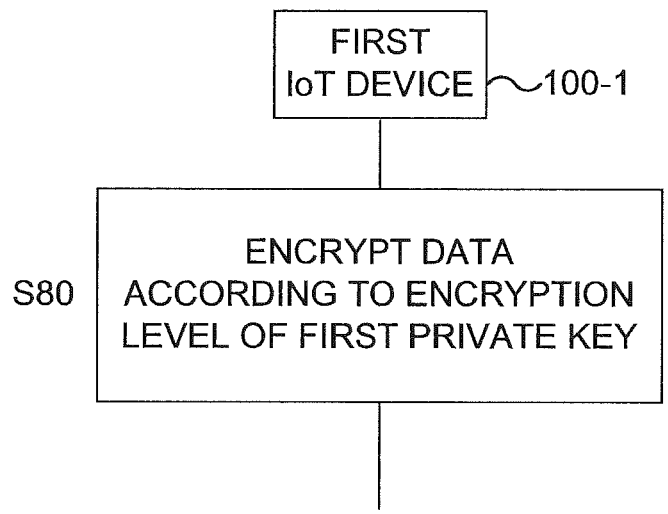
FIG. 10 is an exemplary diagram illustrating the process in the processor in the IoT device according to the embodiment.

FIG. 10 illustrates a process in which the processor 170 encrypts data according to an encryption level of the first private key 130 of FIG. 1.

Referring to FIG. 10, when the first IoT device 100-1 transmits and receives data to and from the second IoT device 100-2 to the $n^{th}$ IoT device 100-*n*, the processor 170 encrypts data according to the encryption level of the first private key 130 of FIG. 1 (S80). For example, when the first private key 130 of FIG. 1 is at a 128-bit level, the processor 170 encrypts the data to correspond to the 128-bit level.

8) Process of Encrypting Data Using the First Private Key or the First Sub-Private Key The processor 170 may further perform a process of encrypting data according to the encryption level of the first private key 130 of FIG. 1 or the first sub-private key 135 of FIG. 1 of the first IoT device 100-1.

FIG. 11 illustrates a process in which the processor 170 encrypts according to the encryption level of the first private key 130 of FIG. 1 or the first sub-private key 135 of FIG. 1.

For example, when the first private key 130 of FIG. 1 is at a 128-bit level, the processor 170 encrypts the data to correspond to the 128-bit level.

For example, when the first sub-private key 135 of FIG. 1 is at an 8-bit level, the processor 170 encrypts the data to correspond to the 8-bit level.

The processor 170 may minimize a load of an arithmetic process according to encryption and reduce a processing time required for the encryption by differentiating an encryption level so as to be suitable for the purpose.

For example, like the key generator 110, the processor 170 may be implemented using an EMV chip manufactured according to the EMV standard or a TEE chip manufactured according to the TEE standard.

However, in addition to the EMV chip or the TEE chip, the processor 170 may be implemented by another type of chip, e.g., a processor having a computing function.

As described above, in accordance with the embodiment, it is possible to provide an IoT device which is capable of defending against an attack such as hacking while strengthening security of IoT by dynamically determining whether to operate as a master device in an IoT network, and, when the master device is determined, generating, distributing, and managing private keys of other IoT devices in the IoT network.

Further, a private key and a sub-private key are used such that an encryption level can be made to be different according to the use. Therefore, it is possible to minimize a load of an arithmetic process according to encryption and reduce a processing time required for the encryption.

Although the configurations of the embodiment have been described in detail, these configurations are merely illustrative, and various modifications can be devised by those skilled in the art to which the present disclosure pertains without departing from the technical features of the present disclosure.

The embodiments disclosed herein, therefore, are not to be taken in a sense for limiting the technique but for explanation thereof, and the spirit and scope of the present disclosure are not limited to these embodiments. The scope of the present disclosure should be construed by the appended claims, along with the full range of equivalents to which such claims are entitled.

In accordance with the present disclosure, it is possible to provide an Internet of things (IoT) device which is capable of defending against an attack such as hacking while strengthening security of IoT by dynamically determining whether to operate as a master device in an IoT network, and, when the master device is determined, generating, distributing, and managing private keys of other IoT devices in the IoT network. Further, a private key and a sub-private key are used such that an encryption level can be made to be different according to the use. Therefore, it is possible to minimize a load of an arithmetic process according to encryption and reduce a processing time required for the encryption.

What is claimed is:

1. A first IoT (Internet of Things) device in an IoT network of the first IoT device through an $n^{th}$ IoT device (where n is a natural number equal to or greater than 2), the first IoT device comprising:
   a key generator configured to store a master key and including a key generation logic for generating a private key based on the master key;
   a receiver/transmitter configured to communicate with the second IoT device through the $n^{th}$ IoT device in the IoT network; and
   a processor configured to perform: (a) determining whether the first IoT device is a master device in the IoT network; (b) when the first IoT device is determined to be the master device in the IoT network, generating a second private key through an $n^{th}$ private key respectively corresponding to the second IoT device through the $n^{th}$ IoT device by using the key generator and transmitting the second private key through the $n^{th}$ private key to the second IoT device through the $n^{th}$ IoT device, respectively, via the receiver/transmitter; and (c) when the first IoT device is determined to be not the master device in the IoT network, receiving a first private key corresponding to the first IoT device from one of the second IoT device through the $n^{th}$ IoT device determined as the master device.

2. The first IoT device according to claim 1, wherein the (a) comprises: (a-1) transmitting a network participation signal to the second IoT device through the $n^{th}$ IoT device via the receiver/transmitter; (a-2) starting an operation of a timer based on a unique identification information of the first IoT device or a random value; and (a-3) determining the first IoT device as the master device when a signal indicating one of the second IoT device through the $n^{th}$ IoT device is the master device is not received from the one of the second IoT device through the $n^{th}$ IoT device via the receiver/transmitter until the operation of the timer is terminated.

3. The first IoT device according to claim 1, wherein the (a) comprises: (a-4) transmitting a signal indicating the first IoT device is the master device to the second IoT device through the $n^{th}$ IoT device via the receiver/transmitter when the first IoT device is determined as the master device.

4. The first IoT device according to claim 1, wherein the (a) comprises: (a-5) releasing the first IoT device from being the master device when a predetermined condition is met after the first IoT device is determined as the master device.

5. The first IoT device according to claim 4, wherein the (a) further comprises: (a-6) transmitting a signal indicating the first IoT device is not the master device to the second IoT device through the $n^{th}$ IoT device via the receiver/transmitter after performing the (a-5).

6. The first IoT device according to claim 4, wherein the predetermined condition includes one of: one or more IoT devices being added to the IoT network; at least one of the second IoT device through the $n^{th}$ IoT device being removed; and the first IoT device being attacked.

7. The first IoT device according to claim 1, wherein the (b) comprises: (b-1) receiving a second normal key through an $n^{th}$ normal key from the second IoT device through the $n^{th}$ IoT device, respectively, via the receiver/transmitter; and (b-2) generating the second private key through the $n^{th}$ private key based on the master key and the second normal key through the $n^{th}$ normal key by using the key generator; and transmitting the second private key through the $n^{th}$ private key to the second IoT device through the $n^{th}$ IoT device, respectively.

8. The first IoT device according to claim 1, wherein the key generator further stores a first normal key, and
   the (c) comprises: (c-1) transmitting the first normal key to the master device via the receiver/transmitter when the one of the second IoT device through the $n^{th}$ IoT device determined as the master device.

9. The first IoT device according to claim 1, wherein the key generator further stores a first normal key, and
   the processor is further configured to perform: (d) generating the first private key based on the master key and the first normal key by using the key generator when the first IoT device is determined as the master device.

10. The first IoT device according to claim 1, wherein the key generator further stores the first private key.

11. The first IoT device according to claim 1, wherein the processor is further configured to perform: (e) determining whether the first IoT device is a sub-master device in the IoT network; (f) when the first IoT device is determined to be the sub-master device in the IoT network, generating a second sub-private key through an $n^{th}$ sub-private key respectively corresponding to the second IoT device through the $n^{th}$ IoT device by using the key generator and transmitting the second sub-private key through the $n^{th}$ sub-private key to the second IoT device through the $n^{th}$ IoT device, respectively, via the receiver/transmitter; and (g) when the first IoT device is determined to be not the sub-master device in the IoT network, receiving a first sub-private key corresponding to the first IoT device from one of the second IoT device through the $n^{th}$ IoT device determined as the sub-master device.

12. The first IoT device according to claim 11, wherein the (e) comprises: (e-1) transmitting the network participation signal to the second IoT device through the $n^{th}$ IoT device via the receiver/transmitter; (e-2) starting an operation of a timer based on a unique identification information of the first IoT device or a random value; and (e-3) determining the first IoT device as the sub-master device when a signal indicating one of the second IoT device through the $n^{th}$ IoT device is the sub-master device is not received from the one of the second IoT device through the $n^{th}$ IoT device via the receiver/transmitter until the operation of the timer is terminated.

13. The first IoT device according to claim 11, wherein the (e) comprises: (e-4) transmitting a signal indicating the first IoT device is the sub-master device to the second IoT device through the $n^{th}$ IoT device via the receiver/transmitter when the first IoT device is determined as the sub-master device.

14. The first IoT device according to claim 11, wherein the (f) comprises: (f-1) receiving a second normal key through an $n^{th}$ normal key from the second IoT device through the $n^{th}$ IoT device, respectively, via the receiver/transmitter; (f-2) generating the second sub-private key through the $n^{th}$ sub-private key based on the master key and the second normal key through the $n^{th}$ normal key by using the key generator;

and (f-3) transmitting the second sub-private key through the n$^{th}$ sub-private key to the second IoT device through the n$^{th}$ IoT device, respectively.

15. The first IoT device according to claim 11, wherein the key generator further stores a first normal key, and the (g) comprises: (g-1) transmitting the first normal key to the sub-master device via the receiver/transmitter; and (g-2) receiving the first sub-private key from the one of the second IoT device through the n$^{th}$ IoT device determined as the sub-master device.

16. The first IoT device according to claim 11, wherein the key generator further stores a first normal key, and the processor is further configured to perform: (h) generating the first sub-private key based on the master key and the first normal key by using the key generator when the first IoT device is determined to be the sub-master device in the IoT network.

17. The first IoT device according to claim 1, wherein the processor is further configured to perform: (i) encrypting data according to an encryption level of the first private key.

18. The first IoT device according to claim 11, wherein the processor is further configured to perform: (j) encrypting data according to an encryption level of the first private key or an encryption level of the first sub-private key.

19. The first IoT device according to claim 11, wherein the key generation logic generates the private key of either a first encryption level or a second encryption level, and an encryption level of the first private key is different from that of the first sub-private key.

20. The first IoT device according to claim 1, wherein at least one of the key generator or the processor comprises an EMV (Europay MasterCard Visa) chip or a TEE (Trusted Execution Environment) chip manufactured in compliance with TEE.

* * * * *